May 14, 1935. M. E. THOMPSON 2,001,439
SYNCHRONOUS MOTOR
Filed March 17, 1933  2 Sheets-Sheet 1
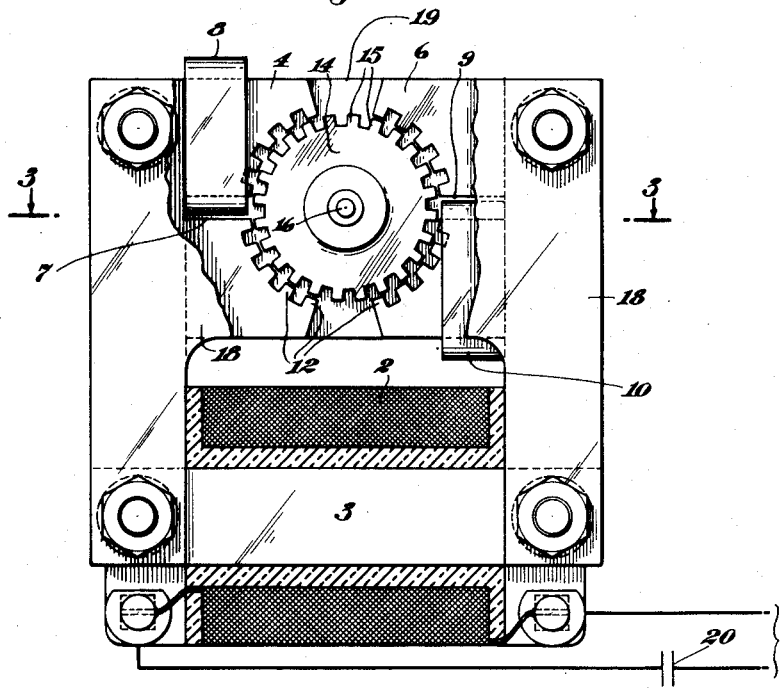
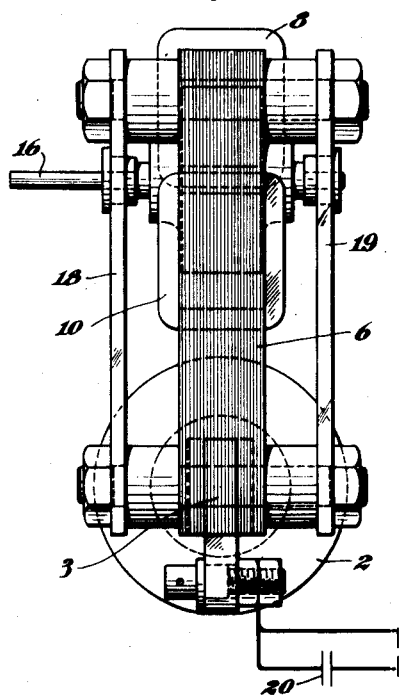
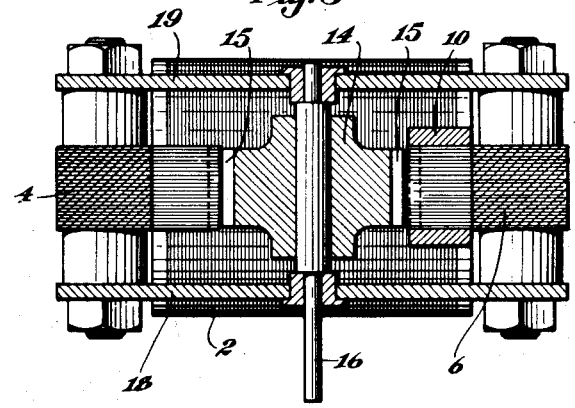
INVENTOR
Milton E. Thompson,
BY Bartlett, Eyre, Scott & Keel
ATTORNEYS May 14, 1935. M. E. THOMPSON 2,001,439
SYNCHRONOUS MOTOR
Filed March 17, 1933 2 Sheets-Sheet 2

INVENTOR
Milton E. Thompson,
BY Bartlett, Eyre, Scott & Keel
ATTORNEYS

Patented May 14, 1935

2,001,439

UNITED STATES PATENT OFFICE 2,001,439

SYNCHRONOUS MOTOR

Milton E. Thompson, Ridgway, Pa.

Application March 17, 1933, Serial No. 661,218

9 Claims. (Cl. 172—278)

My invention relates to an improved synchronous motor for clocks or the like which will operate on a small fraction of the power required for motors now on the market, may be arranged to draw either a leading or lagging current as desired, is not subject to overheating, is substantially noiseless in operation and has unidirectional rotation.

The power required to operate the hands of a clock is small, being in the neighborhood of one twenty-millionth of a horsepower. Synchronous motors of the type now on the market require a power input in the neighborhood of two and a half to three watts and are extremely inefficient; the major portion of the input power being wasted in the motor. I have found that a motor having a toothed bi-polar field with shaded pole sections and a suitably constructed cooperating rotor will operate with relatively high efficiency with an input of less than two tenths of a watt. Moreover, by advancing the teeth of each shaded pole section relative to those of the unshaded sections by a certain amount a practically constant uni-directional driving torque is created which insures stability of the motor at synchronous speeds. Overheating of the motor is substantially eliminated because of the extremely small current drawn by the field and noiseless operation is assured by low magnetic density of the pole pieces.

The particular motor illustrated in the accompanying drawings and hereinafter more particularly described is not self starting but certain of the novel features of the invention are applicable to self starting as well as to non self starting motors as will be apparent to those skilled in the art.

Fig. 1 is a front view, partly in section, of a motor embodying the invention;

Fig. 2 is a side view of the motor of Fig. 1;

Fig. 3 is a sectional view taken along the line 3—3 of Fig. 1 and looking in the direction of the arrows;

Figure 4:
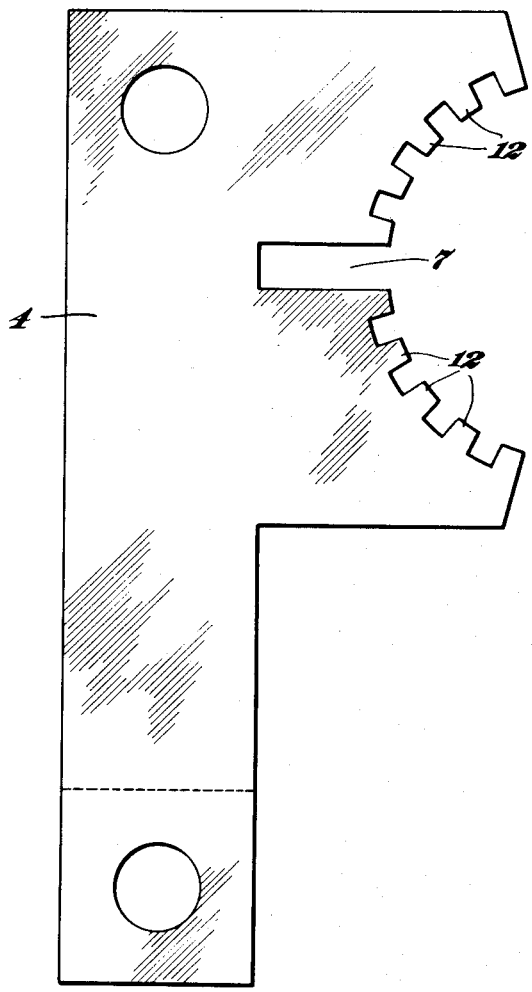
Figs. 4 and 5 are front and side views on a larger scale of one of the pole pieces of the motor.
Figure 5:
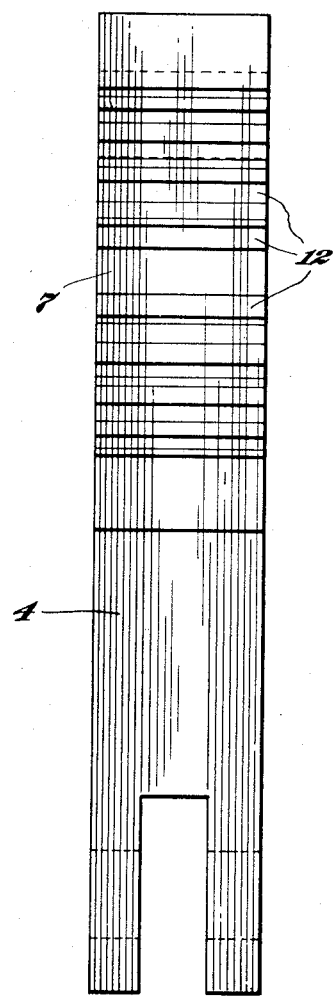
Figure 6:
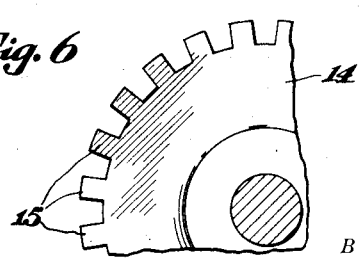
Fig. 6 is a fragmentary enlarged view of the rotor.

The field of the motor comprises the single field coil 2, the laminated core 3 and laminated pole pieces 4 and 6. Coil 2 is of a relatively large number of turns of fine enameled copper wire. Preferably each pole piece 4 and 6 is built of sheets of silicon steel to reduce, as far as possible, the core losses. Pole piece 4 is provided with a deep slot 7 to receive a shading band 8 of solid copper which completely encircles the upper half of the pole piece. Similarly, pole piece 6 is provided with a slot 9 to receive a similar shading band 10 which completely encircles the lower half of the pole piece. Each half of each pole piece is provided with teeth 12 along the periphery of the arcuate sections facing the rotor 14; the teeth of the shaded section of each pole piece being advanced relatively to those on the unshaded sections by an amount which is preferably between one fourth and one half of the tooth pitch. In the particular motor illustrated in the drawings the tooth pitch is fifteen degrees, as measured from the axis of rotor 14 and the teeth 12 on the shaded pole sections are advanced relatively to those on the unshaded sections through an angle of five degrees.

The rotor construction which I have found particularly suitable for cooperation with the above described field structure comprises the single solid piece of soft steel 14 with evenly spaced teeth 15 thereon of a pitch equal to that of the teeth on the pole faces; the diameter of the toothed rotor being such that the clearance between cooperating field and rotor teeth is very small, preferably about one-sixth of the span of a rotor tooth. In the particular embodiment of the invention illustrated the span of each rotor and field tooth is seven degrees and that of the gap between adjoining teeth, eight degrees. Preferably the sides of each tooth are parallel and are not strictly in planes passing through the axis of rotation of the rotor.

The rotor 14 is mounted on a shaft 16 which is rotatably mounted in suitable bearings carried by the cover plates 18 and 19 of the motor. The shaft 16 through suitable reduction gearing (not shown) drives the clock hands in the usual manner.

When an alternating voltage is impressed across the field coil 4 of the motor above described and the rotor given an initial rotation to start the motor the torque created by the rotating field will quickly speed up the rotor until it is rotating in synchronism with the field. At synchronism each tooth 12 of the field exerts a considerable forward pulling torque on the rotor tooth 15 approaching it, which torque varies with the relative position of the teeth and drops to zero when the teeth are in alignment. As any rotor tooth can only pass forward beyond the field tooth with which it has thus been aligned, during the period of reversal of magnetization of the field tooth and as such reversal occurs twice during each alternating cycle, it follows, that but two rotor teeth can pass any one field tooth during one complete cycle. Therefore, at synchronism if the rotor has twenty-four teeth, as in the embodiment illustrated, it will make one complete revolution every twelve cycles of magnetization. Consequently with 60-cycle alternating voltage applied to the field coil, the speed of the rotor will be 300 revolutions per minute. Owing to the particular construction of the field, the teeth of the shaded section of each pole exert maximum forward torque upon the rotor teeth at the moment when a slight negative or backward torque is exerted by the teeth of the unshaded sections and vice versa. Thus there is an overlapping of positive and negative torque by the shaded and unshaded sections which produces a resultant torque on the rotor as a whole which not only never reverses but which is, in fact, fairly constant at all times; the tendency always being to pull the rotor teeth in the direction from unshaded to shaded section of each pole piece. This nearly constant forward torque gives a high degree of stability to the motor and prevents hunting even under severe voltage changes.

A motor constructed as above described, with a field coil of 16,000 turns of #40 enameled copper wire, a rotor of .75 inches and the dimensions of the other parts proportioned thereto in accordance with the drawings, was tested and found to operate efficiently with an input of slightly less than two tenths of a watt when the field coil was connected directly across an one hundred and eighteen volt source of sixty cycle alternating voltage. This small power input represents a large saving in the cost of operation of the new motor as compared to motors now in use. For example, assuming the cost of electrical power at five cents a kilowatt hour, my motor will cost but eight cents a year whereas a motor consuming two and one half watts will cost one dollar and ten cents a year.

The field current of the new motor is so small, being only a few milliamperes, that the temperature rise even when the rotor is not in motion is negligible. Consequently the motor is entirely free from the overheating troubles which are one of the main sources of failure of the small synchronous motors now in use.

Because of the shading of portions of the pole pieces and the relative spacing of the teeth thereon, rotation of the rotor can take place in one direction only, namely from the unshaded to the shaded sections, and inherent stability of the rotor at synchronism is assured. From the numerical values above given from actual tests of my new motor, it will be apparent that, the new motor because of its novel construction is a substantial improvement over those heretofore known.

I claim:

1. A single phase synchronous motor having a rotor and a field structure with two pole faces, each pole face comprising a shaded section having a plurality of teeth thereon and an unshaded section likewise having a plurality of teeth thereon, the teeth of the shaded section of each pole face being advanced relatively to the teeth on the unshaded section of that pole face.

2. A motor according to claim 1 wherein the teeth of the shaded section of each pole face are advanced relatively to the teeth of the unshaded section through an angle between one-fourth and one-half of the tooth pitch.

3. A single phase synchronous motor comprising a toothed rotor, a field structure including a field coil and a pair of laminated pole faces, each pole face comprising an unshaded section and a shaded section, each of said pole sections having teeth cooperating with the teeth on said rotor and having the same pitch as that of the rotor teeth, the teeth of the shaded section of each pole face being advanced relative to those of the unshaded section by an amount between one-fourth and one-half of the tooth pitch.

4. A motor according to claim 3 wherein the space between aligned teeth of rotor and pole face is about one-sixth of the span of a rotor tooth.

5. A synchronous motor according to claim 3 wherein the number of rotor teeth is twenty-four whereby, when a sixty cycle alternating voltage is impressed across said field coil and speed of said rotor at synchronism, is three hundred revolutions per minute.

6. A single phase synchronous motor having a field structure including a field coil and two laminated poles of silicon steel, each pole having a face divided by a slot into two sections, each section of each pole face having a plurality of radially disposed teeth thereon, the teeth of the shaded section of each pole face being advanced relatively to the teeth on the unshaded section of that pole face, a band of copper secured about one section of each face by passage through the slot thereof to shade the section, and a rotor positioned between said pole faces to be influenced by the magnetic field thereof.

7. A single phase synchronous motor having a rotor and a bi-polar field structure, including a field coil and pole pieces having arcuate faces cooperating with said rotor, each pole piece being divided into two sections and each section being provided with a plurality of teeth along the arcuate faces thereof, and a solid band of copper secured about one section of each pole face to shade the same to produce a rotating magnetic field, the teeth of the shaded section of each pole face being advanced relatively to the teeth of the unshaded section of that pole face.

8. A motor according to claim 7 wherein the advance of the teeth on the section of each pole face shaded by said bands relatively to those of the unshaded sections is through an angle between one-fourth and one-half of the tooth pitch.

9. A motor according to claim 7 wherein said rotor is provided with teeth of the same pitch as that of the teeth of the pole faces.

MILTON E. THOMPSON.

CERTIFICATE OF CORRECTION.

Patent No. 2,001,439.  May 14, 1935.

MILTON E. THOMPSON.

It is hereby certified that error appears in the printed specification of the above numbered patent requiring correction as follows: Page 2, second column, line 29, claim 5, for "and" read the; and that the said Letters Patent should be read with this correction therein that the same may conform to the record of the case in the Patent Office.

Signed and sealed this 25th day of June, A. D. 1935.

Bryan M. Battey (Seal)

Acting Commissioner of Patents.